Jan. 29, 1924.

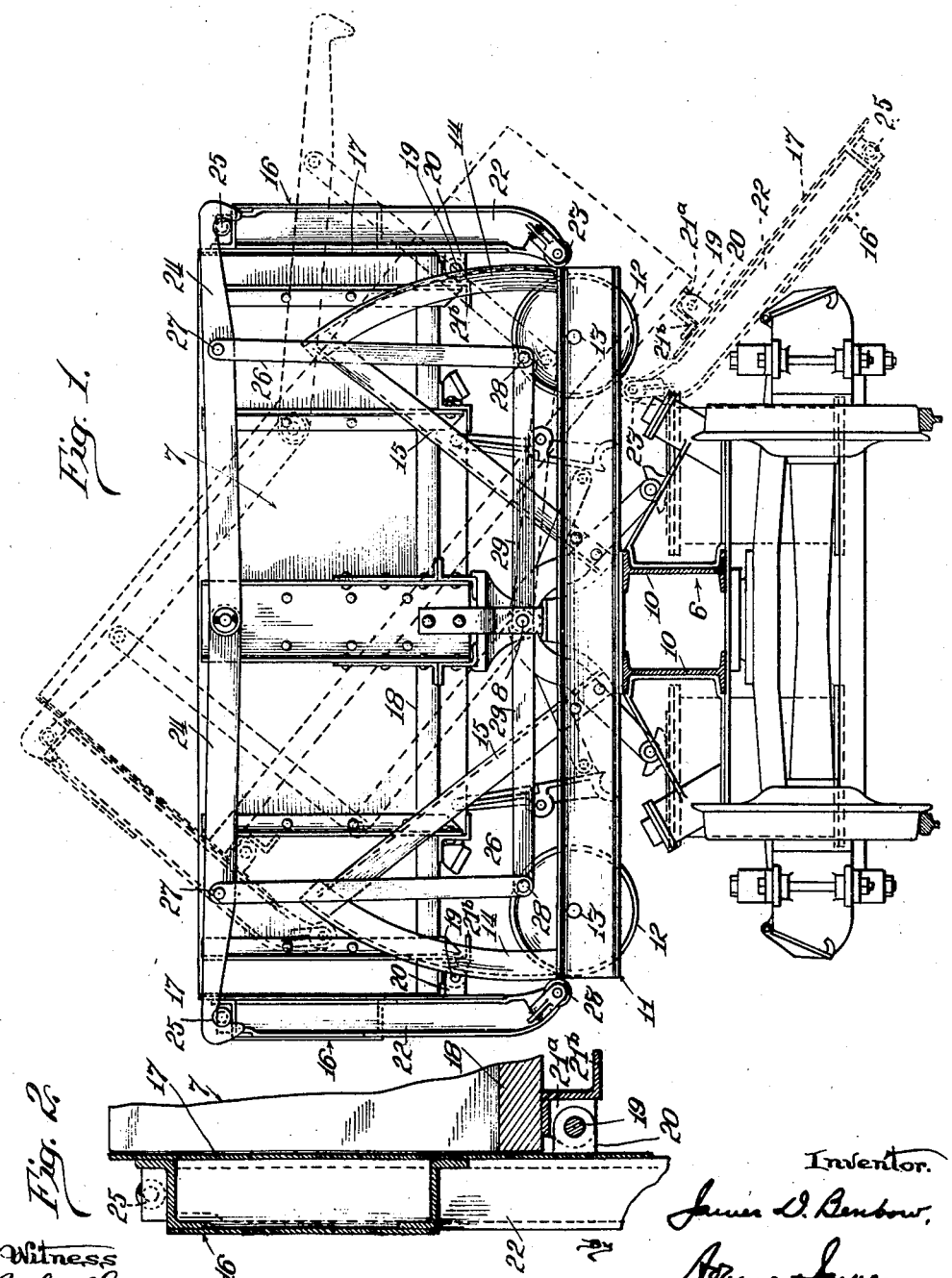

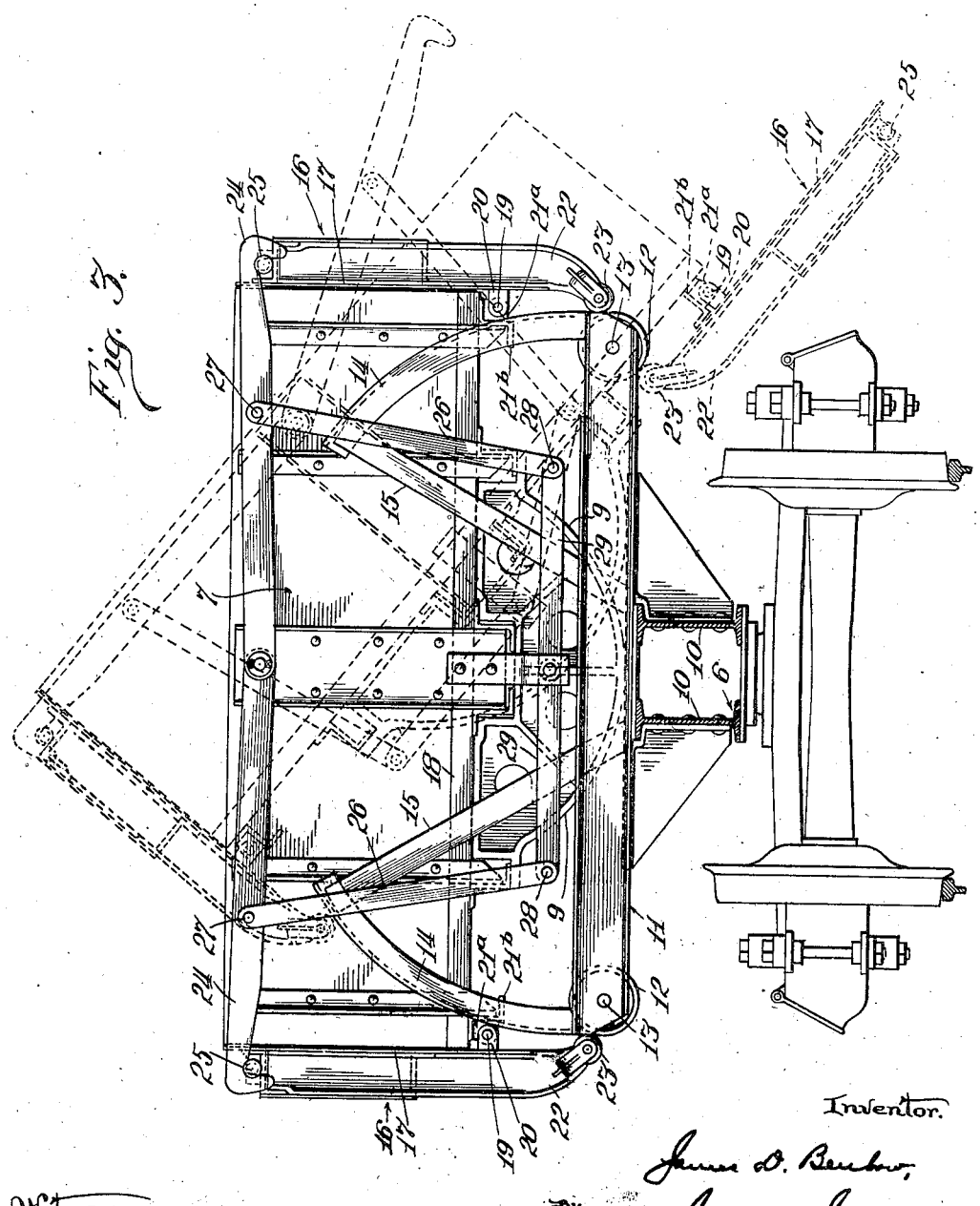

J. D. BENBOW

DUMP CAR

Filed Aug. 3, 1922

Patented Jan. 29, 1924.

1,481,788

UNITED STATES PATENT OFFICE.

JAMES D. BENBOW, OF AURORA, ILLINOIS, ASSIGNOR TO WESTERN WHEELED SCRAPER COMPANY, OF AURORA, ILLINOIS, A CORPORATION OF ILLINOIS.

DUMP CAR.

Application filed August 3, 1922. Serial No. 579,376.

*To all whom it may concern:*

Be it known that I, JAMES D. BENBOW, a citizen of the United States, and a resident of Aurora, in the county of Kane and State of Illinois, have invented certain new and useful Improvements in Dump Cars, of which the following is a specification, reference being had to the accompanying drawings.

My invention relates to dump cars and has particularly to do with those provided with downwardly opening side gates arranged when opened to form an extension which projects laterally beyond the side margin of the bed at or below the level of the floor thereof. It has for its object to provide improved means for controlling the opening and closing of the gate or gates; to provide for securely locking the gate in its closed position; and in a dump car arranged to dump at either side to provide means for holding shut the gate at the upper side of the car when the load is being dumped at the opposite side. I accomplish this object as illustrated in the drawings and hereinafter described. What I regard as new is set forth in the claims.

In the accompanying drawings,—

Fig. 1 is an end elevation of a dump car provided with my improvements;

Fig. 2 is an enlarged sectional view, on line 2—2 of Fig. 4, through one of the side gates and the side portion of the car bed showing the manner in which the gate is pivotally connected therewith;

Fig. 3 is an end view showing my improvements applied to a car in which the bed is mounted on rocker bearings instead of on fixed pivots as shown in Fig. 1;

Figure 4:
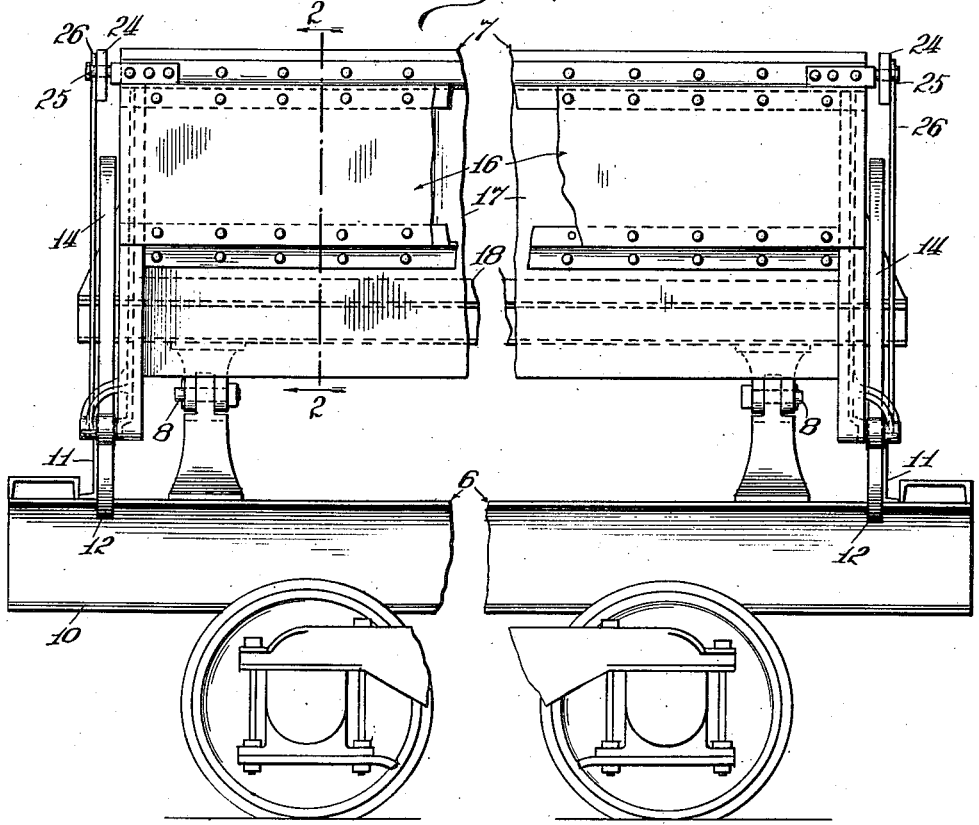
Fig. 4 is a side view, partly broken away.
Figure 5:
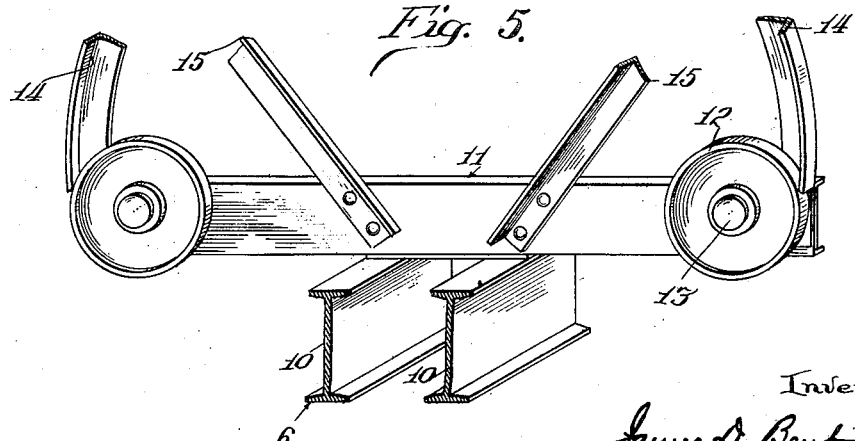
Fig. 5 is a perspective view showing certain details of construction.

Referring to the drawings,—6 indicates as a whole the under-body of the car, and 7 the bed or box thereof, which, in the construction illustrated, is arranged to rock in either direction from its normal or horizontal position so that its load may be discharged at either side of the track. The bed may be mounted on fixed pivots 8 disposed centrally under the bed in the usual way, as shown in Fig. 1, or if preferred may be mounted on rockers 9 as shown in Fig. 3. Suitable power operated means is preferably provided for tilting the bed and for righting it, and it may be normally held in its horizontal position in any approved way. Such mechanism has nothing to do with my present invention, but in the drawings I have indicated some of the parts thereof according to designs which have been extensively used and are well-known to those familiar with the art.

In the construction illustrated the under-body comprises two longitudinally-extending I-beams 10 which form the main support for the bed, and upon the end portions of these I-beams are mounted transversely-disposed channel bars 11 the length of which is substantially equal to the width of the car bed. These channel bars are fixedly secured in position, and upon the end portions thereof are mounted rollers 12 supported by pivots 13. Also, rising from the end portions of said channel bars are segmental bars 14, the upper ends of which are braced by braces 15 so that said segmental bars, which will be hereafter referred to as locking bars, are securely held in an upright position.

16 indicates side gates for the bed 7 which are preferably of the hollow construction shown in Fig. 2, and comprise inner plates 17 adapted to fit over and close the sides of the bed. These gates are pivotally connected with the bed below the floor 18 thereof by pivots 19 which pass through lugs 20 carried by the plates 17, and through suitable lugs 21ª carried by Z-bars 21 which extend longitudinally under and are secured to the floor 18 near the side margins thereof, as best shown in Fig. 2. Thus the side gates 16 are adapted to swing downward and outward until they assume the position shown in dotted lines at the right in Fig. 1, at which time they form an extension of the floor of the bed and direct the load out beyond the under-body of the car and at one side of the road bed. The gates 16 also comprise arms 22, which, when the gate is in its normal position, are disposed vertically, and extend down some considerable distance below the floor of the bed, as shown in Fig. 1. At their lower ends said arms are curved inwardly and are provided with rollers 23 which are adapted to bear peripherally on the rollers 12. Said rollers 23 are also adapted to run on the outer faces of the locking bars 14, as illustrated by the dotted lines at the left in Fig. 1. By this construction the rollers 12 operate to control the downward swinging of the side gate at the side at which the load is to be dumped, and also to restore the gate to its normal or operative position when the bed is being righted, and the locking bars 14 operate to hold the door at the upper side of the bed in its closed position while the load is being dumped at the opposite side, as in the latter case the rollers 23 at the upper side of the car ride up along the locking bars 14 at that side and are thereby prevented from moving inwardly as is necessary to permit the gate to swing outward or downward away from its operative position. When the load is being dumped the rollers 23 at that side of the car will ride around the under surface of the rollers 12 on which they bear, and consequently the arms 22 may swing to permit the gate to open. While the bed is being righted the rollers 23, of course, travel in the opposite direction, and the lower ends of the arms 22 are moved outward by the rollers 12, thereby shutting the gate at that side.

Inasmuch as the upper portions of the side gates are removed a considerable distance from the pivots 19 and consequently the load exerts a considerable strain upon the upper portions of the gates, it is desirable that additional means be provided for holding the gates in operative position. For this purpose hooks 24 are provided at the ends of the bed, the inner ends of said hooks being mounted on pivots 25 so that their outer ends may swing vertically. The outer ends of said hooks are adapted to engage pins 25 provided at the upper edges of the gates, but they may be lifted vertically out of engagement with said pins to release the gates when the bed is to be dumped. In order to release the appropriate hooks automatically, bars 26 are provided which at their upper ends are connected by pivots 27 with the hooks 24, and at their lower ends are connected by pivots 28 with vertically-swinging links 29 extending transversely of the bed and pivotally supported at their inner ends on or in line with the pivots 8. The lower ends of the bars 26 are adapted to engage the upper surface of the channel bars 11 when the bed is tilted to discharge its load, as illustrated by dotted lines at the right in Figs. 1 and 3. When this occurs the tilting of the bed operates through the bars 26 to hold the hooks 24 at the lower side of the bed in approximately their normal position while that side of the bed descends, thereby releasing the lower side gate from the hooks at that side and permitting it to swing outward and downward in the manner described. The restoration of the bed to its normal position causes said hooks to re-engage the side gates by swinging the pins 25 under the rounded end portions of said hooks, which are free to rise under the pressure applied by the returning movement of the gate. The hooks at the upper side of the bed are not affected by the dumping operation as the bars 26 at that side are free to swing upwardly with the bed, as illustrated in dotted lines at the left in Fig. 1.

While I have shown and described my improvements applied to a car the bed of which is arranged to dump at either side, some of the features thereof may be applied to cars arranged to dump at one side only, or they may be applied to cars arranged for end dumping, and the claims hereinafter made should, therefore, be construed accordingly.

What I claim as my invention and desire to secure by Letters Patent, is—

1. A dump car comprising a tilting bed, an under-body on which said bed is mounted, transverse bars mounted on said under-body, rollers carried by said transverse bars adjacent to one of the side margins of said bed, a side gate pivotally connected with the bed adjacent to the floor thereof whereby the upper margin of said gate may swing outward and downward, and arms carried by and depending from said gate and adapted to ride on said rollers when the car bed is tilted.

2. A dump car comprising a tilting bed, an under-body on which said bed is mounted, transverse bars mounted on said under-body, rollers carried by said transverse bars adjacent to one of the side margins of said bed, a side gate pivotally connected with the bed adjacent to the floor thereof whereby the upper margin of said gate may swing outward and downward, arms carried by and depending from said gate, and rollers carried by said arms and adapted to run on the peripheries of said first-mentioned rollers when the car bed is tilted.

3. A dump-car comprising a tilting bed, an under-body on which said bed is mounted to tilt in either direction from its normal position, downwardly-swinging side gates at opposite sides of the bed and pivotally connected therewith adjacent to the floor thereof, means actuated by the tilting of the bed for opening the gate at the side at which the load is to be discharged, depending arms carried by said gates, and vertically-disposed inwardly-curved bars carried by the under-body at each side thereof adapted to be engaged, when the car bed is tilted, by the depending arms at the higher side of the bed so as to hold the gate at such higher side in its closed position.

4. A dump-car comprising a tilting bed, an under-body on which said bed is mounted to tilt in either direction from its normal position, downwardly-swinging side gates at opposite sides of the bed and pivotally connected therewith adjacent to the floor thereof, means actuated by the tilting of the bed for opening the gate at the side at which the load is to be discharged, depending arms carried by said gates, and fixed means at each side of the said under-body with which, when the car-bed is being tilted, the said arms at the higher side of the bed maintain a constant moving engagement for holding the gate at such higher side in its closed position.

5. A dump-car comprising a tilting bed, an under-body on which said bed is mounted to tilt in either direction from its normal position, transverse bars mounted on said under-body, a roller carried at each end portion of each transverse bar adjacent to the side margins of said bed, downwardly-swinging side gates at opposite sides of the bed and pivotally connected therewith adjacent to the floor thereof, means actuated by the tilting of the bed for opening the gate at the side at which the load is to be discharged, depending arms carried by each of said gates, and vertically-disposed inwardly-curved bars carried by the under-body at each side thereof, the curved bars at one side of the car being adapted to be engaged, when the car bed is tilted, by the depending arms at the higher side of the bed so as to hold the gate at such higher side in its closed position, and the said rollers at the lower side of the bed being at the same time engaged by the other depending arms.

6. A dump-car comprising a tilting bed, an under-body on which said bed is mounted to tilt in either direction from its normal position, downwardly-swinging side gates at opposite sides of the bed and pivotally connected therewith adjacent to the floor thereof, each of said gates having a member extending below the pivotal point of attachment of the gate, two sets of locking means for each gate that respectively engage and lock the gates above and below said pivotal point of attachment, each of said sets acting to hold a gate in locked position during the time the said bed is tilted to dump at the opposite side of the car and until the bed is returned to normal position, and means actuated by the tilting of the bed for opening the gate at the side at which the said bed is to dump its load.

7. A dump car comprising a tilting bed, an under-body on which said bed is mounted to tilt in either direction from its normal position, downwardly-swinging side gates at opposite sides of the bed and pivotally connected therewith adjacent to the floor thereof, means actuated by the tilting of the bed for opening the gate at the side at which the load is to be discharged, and means for positively holding the gate at the higher side of the bed in operative position while the bed remains tilted, said last-named means comprising devices adapted to respectively engage said last-named gate at opposite sides of its pivotal connection with the bed.

8. A dump car comprising a tilting bed, an under-body on which said bed is mounted to tilt in either direction from its normal position, downwardly-swinging side gates at opposite sides of the bed and pivotally connected therewith adjacent to the floor thereof, means actuated by the tilting of the bed for opening the gate at the side at which the load is to be discharged, means engaging the upper marginal portion of the gate at the higher side of the bed for holding said gate in operative position while the bed remains tilted, and other means carried respectively by the under-body and the lower part of such gate for aiding in holding such gate in its closed position.

9. A dump car comprising a tilting bed, an under-body on which said bed is mounted to tilt in either direction from its normal position, downwardly-swinging side gates at opposite sides of the bed and pivotally connected therewith adjacent to the floor thereof, means actuated by the tilting of the bed for opening the gate at the side at which the load is to be discharged, and means cooperating with the lower portion of the gate at the higher side of the bed for holding said gate in operative position while the bed remains tilted.

10. A dump car comprising a tilting bed, an under-body on which said bed is mounted to tilt in either direction from its normal position, downwardly-swinging side gates at opposite sides of the bed and pivotally connected therewith adjacent to the floor thereof, means actuated by the tilting of the bed for opening the gate at the side at which the load is to be discharged, depending arms carried by said gates, and vertically-disposed locking bars carried by the under-body and adapted to cooperate with said arms when the car bed is tilted to hold the gate at the higher side of the bed in its closed position.

11. A dump car comprising a tilting bed, an under-body on which said bed is mounted to tilt in either direction from its normal position, downwardly-swinging side gates at opposite sides of the bed and pivotally connected therewith adjacent to the floor thereof, means actuated by the tilting of the bed for opening the gate at the side at which the load is to be discharged, depending arms carried by said gates, vertically-disposed locking bars carried by the under-body and adapted to cooperate with said arms when the car bed is tilted to hold the gate at the higher side of the bed in its closed position, and hooks carried by the bed and normally engaging the upper marginal portions of said gates for holding said gates in their closed position.

12. A dump car comprising a tilting bed, an under-body on which said bed is mounted to tilt in either direction from its normal position, downwardly-swinging side gates at opposite sides of the bed and pivotally connected therewith adjacent to the floor thereof, means actuated by the tilting of the bed for opening the gate at the side at which the load is to be discharged, depending arms carried by said gates, vertically-disposed locking bars carried by the under-body and adapted to cooperate with said arms when the car bed is tilted to hold the gate at the higher side of the bed in its closed position, hooks carried by the bed and normally engaging the upper marginal portions of said gates for holding said gates in their closed position, and means actuated by the tilting of the bed for releasing the hooks at the lower side thereof.

JAMES D. BENBOW.